United States Patent
Sun et al.

(10) Patent No.: US 10,590,747 B2
(45) Date of Patent: Mar. 17, 2020

(54) REAL-TIME CONTROL OF DIVERTERS

(71) Applicant: Halliburton Energy Services, Inc., Houston, TX (US)

(72) Inventors: Zhijie Sun, Spring, TX (US); Jason D. Dykstra, Spring, TX (US); Qiuying Gu, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 235 days.

(21) Appl. No.: 15/753,644

(22) PCT Filed: Sep. 21, 2015

(86) PCT No.: PCT/US2015/051247
§ 371 (c)(1),
(2) Date: Feb. 20, 2018

(87) PCT Pub. No.: WO2017/052499
PCT Pub. Date: Mar. 30, 2017

(65) Prior Publication Data
US 2018/0238169 A1  Aug. 23, 2018

(51) Int. Cl.
*E21B 41/00* (2006.01)
*E21B 43/26* (2006.01)
(Continued)

(52) U.S. Cl.
CPC .......... *E21B 41/0092* (2013.01); *E21B 43/26* (2013.01); *C09K 8/62* (2013.01);
(Continued)

(58) Field of Classification Search
CPC ...... E21B 49/00; E21B 49/006; E21B 47/102; E21B 47/04; E21B 41/0092; E21B 43/26; G01V 1/288; G01V 1/50; G01V 1/226; G01V 2210/646; G01V 2210/123; G01F 1/661; C09K 8/62
See application file for complete search history.

(56) References Cited

U.S. PATENT DOCUMENTS 5,238,067 A  8/1993 Jennings, Jr.
7,451,812 B2  11/2008 Cooper et al.
(Continued)

OTHER PUBLICATIONS

International Preliminary Search Report issued in related PCT Application No. PCT/US2015/051247 dated Apr. 5, 2018, 13 pages.
(Continued)

*Primary Examiner* — Michael R Wills, III
(74) *Attorney, Agent, or Firm* — John W. Wusterberg; Baker Botts L.L.P.

(57) ABSTRACT

In some aspects, the present disclosure includes systems and methods for determining and delivering diverting material to dominant fractures in a stage of a subterranean formation. The method includes creating or extending a plurality of fractures in a stage of a subterranean formation; pumping fracturing fluid to the plurality of fractures; identifying dominant fractures among the plurality of fractures; determining a desired amount of diverters to deliver to the dominant fractures; and pumping the determined amount of diverters to the dominant fractures so as to redistribute the flow of fracturing fluid between the plurality of fractures.

18 Claims, 3 Drawing Sheets

(51) Int. Cl.
   *C09K 8/62* (2006.01)
   *G01V 1/22* (2006.01)
   *G01V 1/50* (2006.01)

(52) U.S. Cl.
   CPC ............... *G01V 1/226* (2013.01); *G01V 1/50* (2013.01); *G01V 2210/123* (2013.01); *G01V 2210/646* (2013.01)

(56) References Cited

U.S. PATENT DOCUMENTS

| | | | |
|---|---|---|---|
| 8,657,003 B2 | 2/2014 | Welton et al. | |
| 2003/0205083 A1 | 11/2003 | Tubel et al. | |
| 2010/0224365 A1 | 9/2010 | Abad | |
| 2013/0048282 A1 | 2/2013 | Adams et al. | |
| 2013/0341030 A1* | 12/2013 | Brannon | C09K 8/60 166/308.2 |
| 2014/0182841 A1* | 7/2014 | Lecerf | E21B 43/25 166/250.01 |
| 2015/0075779 A1* | 3/2015 | Walters | E21B 49/008 166/250.1 |
| 2015/0345267 A1* | 12/2015 | Modavi | E21B 43/16 166/271 |

OTHER PUBLICATIONS

International Search Report and Written Opinion issued in related PCT Application No. PCT/US2015/051247 dated Jun. 7, 2016, 18 pages.

\* cited by examiner

REAL-TIME CONTROL OF DIVERTERS

CROSS-REFERENCE TO RELATED APPLICATION

The present application is a U.S. National Stage Application of International Application No. PCT/US2015/051247 filed Sep. 21, 2015, which is incorporated herein by reference in its entirety for all purposes.

TECHNICAL FIELD

The present disclosure relates generally to techniques for fracturing subterranean formations, and more particularly, to the use of diverters to redistribute fracturing fluid between subterranean fractures.

BACKGROUND

Subterranean treatment fluids are commonly used in stimulation, sand control, and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a subterranean treatment that often uses an aqueous treatment fluid is hydraulic fracturing. In a hydraulic fracturing treatment, a viscous fracturing fluid is introduced into the formation at a high enough rate to exert sufficient pressure on the formation to create and/or extend fractures therein. The viscous fracturing fluid suspends proppant particles that are to be placed in the fractures to prevent the fractures from fully closing when hydraulic pressure is released, thereby forming conductive channels within the formation through which hydrocarbons can flow toward the well bore for production. In certain circumstances, variations in the subterranean formation will cause the fracturing fluid to create and/or extend fractures non-uniformly. Typically, one or more dominant fractures may extend more rapidly than non-dominant fractures. These dominant fractures utilize significantly more fracturing fluid than non-dominant fractures, thereby reducing pressure on non-dominant fractures and slowing or stopping their extension. Dominant fractures can be identified using fiber optics to measure fluid flow rates to each fracture and/or using micro-seismic sensors to detect the growth rate and direction of the fractures. Operators have addressed the unbalanced distribution of fracture fluid by introducing a certain quantity of diverters into the fracturing fluid when dominant fractures are identified. The diverters travel to the dominant fractures and restrict the flow of fracturing fluid to the dominant fractures or plug the dominant fractures. In some applications, these diverters are composed of degradable materials, including water-hydrolysable materials such as polylactic acid, which degrade over time and restore permeability to plugged or restricted fractures.

Typically, operators have relied on a desired fluid pressure per fracture as a rule of thumb to determine when to introduce diverters to the fracturing fluid without regard for specific features of the subterranean formation. Introduction of an insufficient quantity of diverters to properly restrict dominant fractures may delay redistribution of fracturing fluid flow and slow treatment of the formation. Introduction of an excess quantity of diverters may plug both dominant and non-dominant fractures causing unnecessary pressure build up.

Thus it is desirable to consider real-time information about the features of the subterranean formation and/or historical data for similar subterranean formations to determine both when to introduce diverters to the fracturing fluid and the quantity of diverters to introduce to properly redistribute fracturing fluid between the subterranean fractures.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to techniques for fracturing subterranean formations, and more particularly, to the use of diverters to redistribute fracturing fluid between subterranean fractures. The present invention provides improved methods of determining desired diverter quantities for dominant subterranean fractures in a stage of subterranean treatment. These methods include use of real-time down-hole conditions and/or historical data to determine desired diverter amounts to prevent undesired fracture behaviors.

Figure 1:
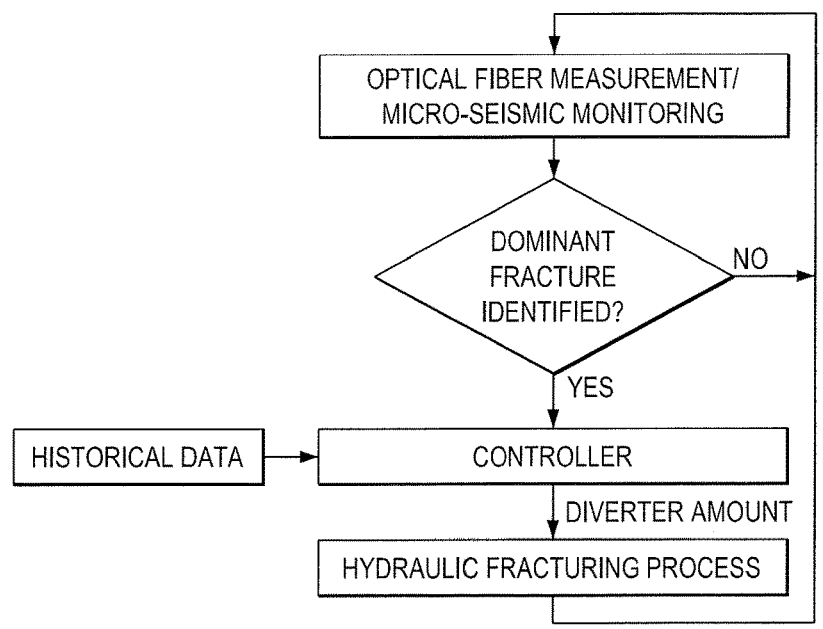
FIG. 1 illustrates a block diagram of an exemplary control system utilizing historical data, in accordance with some embodiments of the present disclosure.

FIG. 1 illustrates a block diagram of an exemplary control system utilizing historical data, in accordance with some embodiments of the present disclosure. Fiber optics may be used to identify dominant fractures. One way to detect subterranean fractures using fiber optics is distributed acoustic sensing of flow rate of fracturing fluid to each subterranean fracture. Pulses of light in fiber optic are naturally backscattered through Rayleigh, Brillouin, and Raman scattering and this backscattered light may be recorded and used to measure the acoustic field along the fiber. Analysis of the acoustic field yields a measure of noise along the fiber. Because higher flow rates create more noise than lower flow rates, the acoustic field analysis may be used to determine flow rate of fracturing fluid to individual fractures and by extension the growth rate of individual fractures.

In another embodiment, micro-seismic measurements measuring growth rate and direction of the subterranean fractures may be used to identify dominant fractures. Microseismic fracture mapping may use a downhole receiver array positioned near the depth of the fracture. The array detects microseisms triggered by shear slippage when the pressure of fracturing fluid creates and/or extends fractures and may be used to map the location of the microseisms to determine the growth rate, largest growth rate and direction of fractures, which in turn may be used to identify dominant fractures.

No action is initiated by the controller absent identification of one or more dominant fractures. When a dominant fracture is identified, the optimal controller determines a desired diverter quantity for delivery to the dominant fracture based on historical job data from the same stage and/or from previous stages or wells. Historical treatment data, formation properties, fracturing fluid properties, diverter properties, down-hole properties, and total diverter quantity introduced before desired fluid redistribution, is aggregated and provided to the optimal controller. Based on these inputs, the optimal controller may determine the desired diverter quantity for fluid redistribution among the fractures by comparing real-time data with the historical data.

The optimal controller may also introduce the diverter quantity into fracturing fluid pumped downhole to deliver the diverter to the dominant fracture. Alternatively, the controller may prompt user intervention to introduce the determined diverter quantity to the fracturing fluid for delivery to the dominant fracture. Continuous measurements are taken to determine when the diverters have arrived at and settled at the fracture and when the fracturing fluid has redistributed sufficiently. The process may repeat upon identification of newly dominant fractures.

Figure 2:
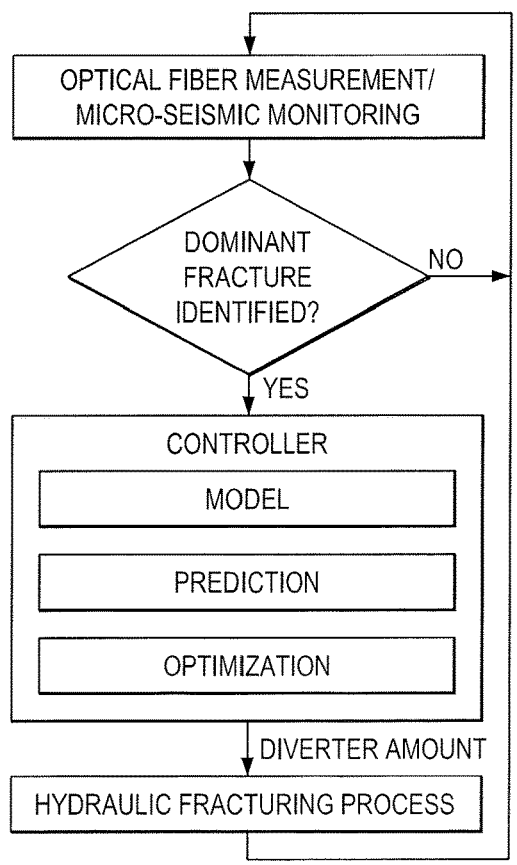
FIG. 2 illustrates a block diagram of an exemplary control system utilizing a model-driven controller, in accordance with some embodiments of the present disclosure.

In another embodiment, the controller relies on a model. FIG. 2 illustrates a block diagram of an exemplary control system utilizing a model-driven controller, in accordance with some embodiments of the present disclosure. The model can be generated from historical data, derived from physical laws, or a combination of both. Model input may include diverter properties such as quantity, size, and material; type of subterranean formation; stress load on the subterranean formation; well properties such as type and depth; number of fractures; fracturing fluid properties; and proppant characteristics such as quantity, size, and material. Model output may include predicted outcome of fluid redistribution, such as equilibrium downhole pressure after delivery of diverters; fiber optic data which may indicate predicted fracturing fluid flow rate; and/or micro-seismic data which may indicate predicted fracture growth rate and direction. The model may be static or dynamic. Mathematically, the dynamic model can be written as:

$$y(t) = G(s)*u(t)$$

where u(t) and y(t) are input and output vectors respectively and G(s) is the continuous-time transfer function model. The input vector u(t) may include pump rate, diverter mass flow rate, and fracturing fluid density. The output vector y(t) may include changes to fluid flow rate at each fracture, denoted by $y_1(t), \ldots, y_m(t)$, and the pressure increase due to diverters for each fracture denoted by $y_{m+1}(t), \ldots, y_{2m}(t)$, where m is the number of fractures. By properly discretizing the system, the model becomes $$y(k) = G(z)*u(k)$$

where G(z) is the discrete-time transfer function model, and k represents the k-th time instant. The control signal may be generated by solving the following optimization problem:

$$\min \sum_{j=k}^{k+N} \left[ W_1 \sum_{i=1}^{m} (y_i(j) - p_0)^2 + W_2 \sum_{i=m+1}^{2m} (y_i(j) - \bar{y}_l(j))^2 \right]$$

subject to $$y(j) = [y_1(j), y_2(j), \ldots, y_{2m}(j)] = G(z)u(j)$$

$$\bar{y}_l(j) = \frac{1}{m}[y_{m+1}(j) + y_{m+2}(j) + \ldots + y_{2m}(j)]$$

$$0 \le u(j) \le u^{max}$$

$$j = k, \ldots, k+N$$

where k is the current time constant and N is the prediction horizon. The first term in the cost function computes pressure changes due to the presence of diverters, where $p_0$ denotes baseline pressure prior to diverters arrival at the dominant fracture. The second term in the cost function penalizes uneven flow distribution between fractures. The optimization problem may not be sufficiently accurate upon initial computation and may be updated to properly account for new data.

Figure 3:
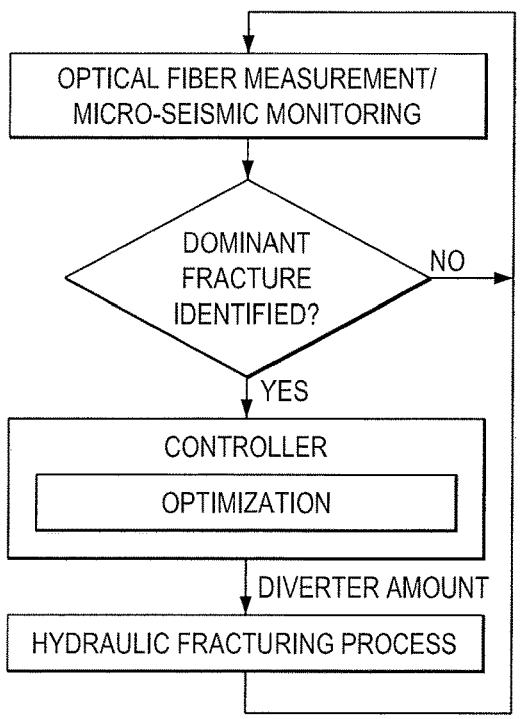
FIG. 3 illustrates a block diagram of an exemplary control system utilizing a model-free controller, in accordance with some embodiments of the present disclosure.

In another embodiment, the controller is an extremum-seeking controller, which relies on real-time data and does not utilize model information. FIG. 3 illustrates a block diagram of an exemplary control system utilizing a model-free controller, in accordance with some embodiments of the present disclosure. The cost function for the model-free controller is the same as for the model-based controller. However, the model-free controller determines an optimal diverter quantity by introducing a sinusoidal signal to the controller to perturbing the controller output to obtain the model output gradient. The gradient is used by the extremum-seeking controller to determine diverter quantity. When sufficient diverters are introduced to the fracturing fluid for delivery to the dominant fracture, the model-free controller drives the control signal back to zero. The process may repeat upon identification of newly dominant fractures or to refine the fracturing fluid distribution.

Figure 4:
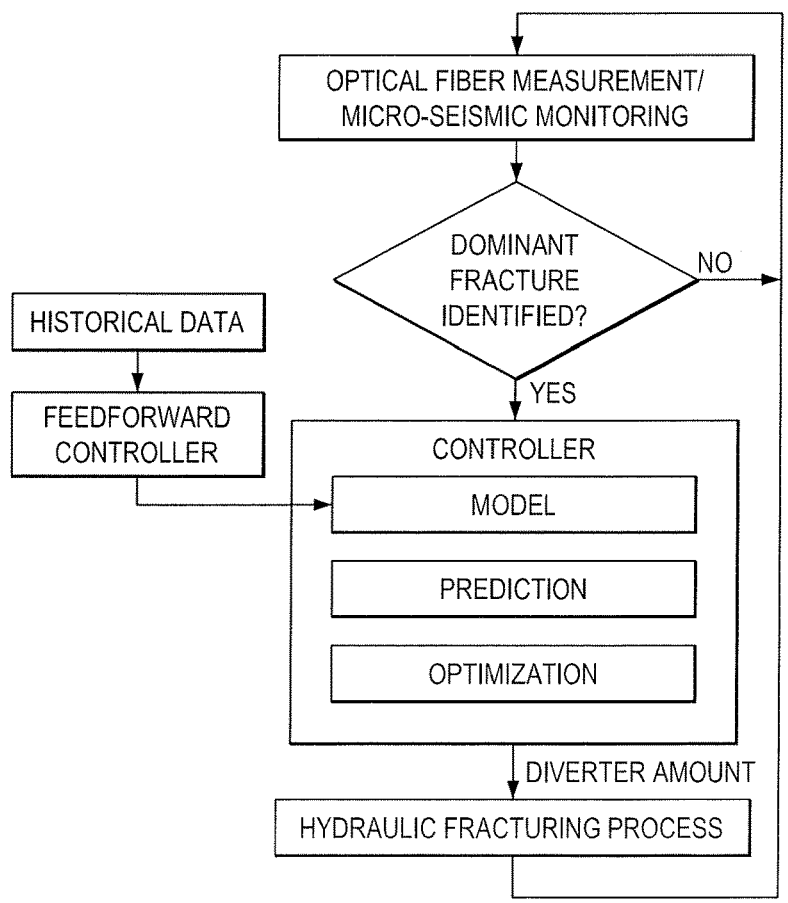
FIG. 4 illustrates a block diagram of an exemplary control system utilizing a controller combining a model and historical data, in accordance with some embodiments of the present disclosure.
Figure 5:
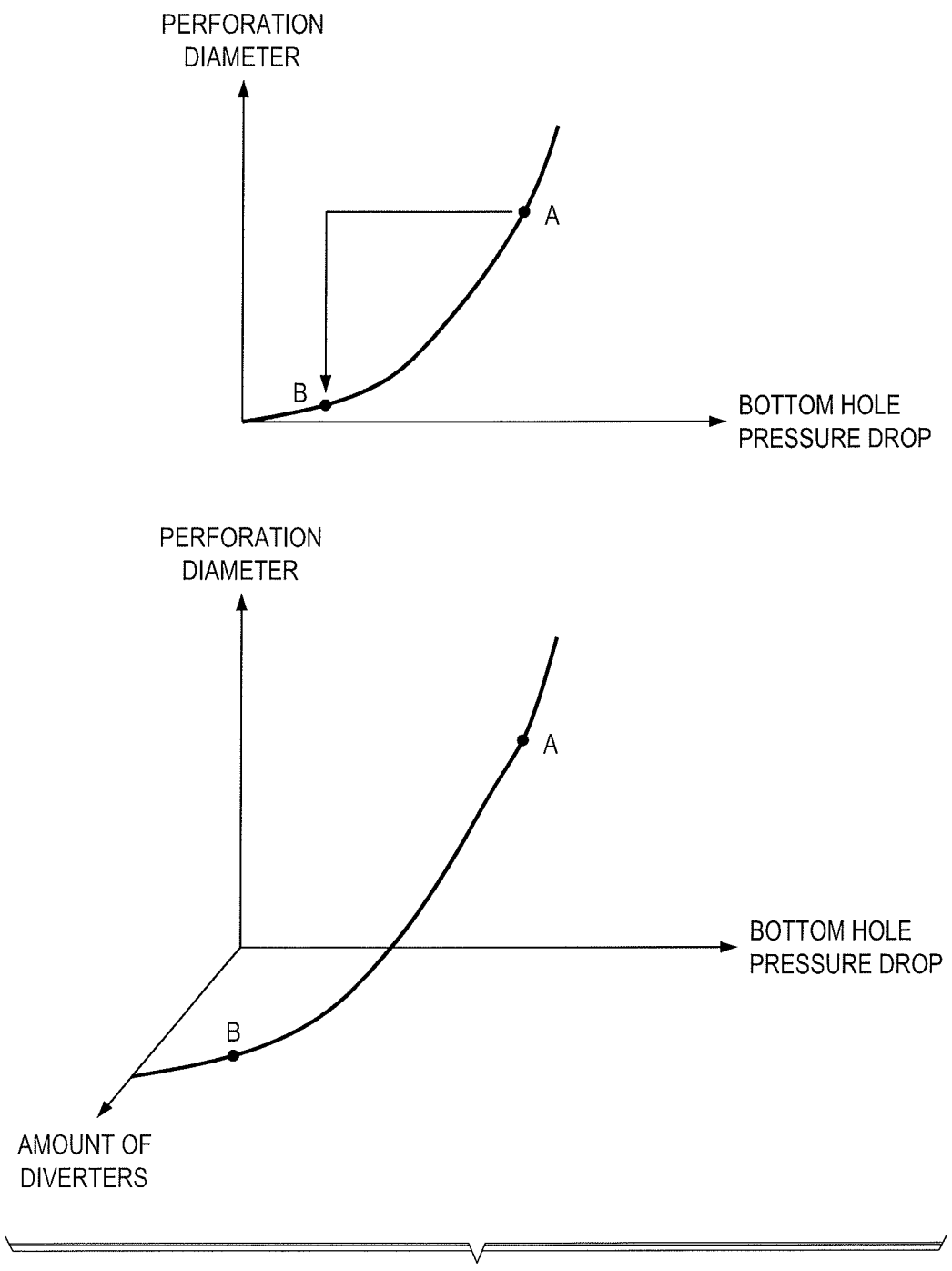
FIG. 5 illustrates a graph of an exemplary learning model using down-hole pressure change and perforation diameter of the fracture to determine fracture diameter and determine a quantity of diverters to properly redistribute fracturing fluid between fractures.

In some embodiments, the controller proposed in previous embodiments may utilize historical data to provide a reasonable and feasible initial estimate. FIG. 4 illustrates a block diagram of an exemplary control system utilizing a controller combining a model-based approach and historical data, in accordance with some embodiments of the present disclosure. Both the model of previous embodiments and data collected from prior subterranean treatment of similar formations and/or similar treatment configurations are used to determine a quantity of diverters. Historical treatment data may be used to correlate down-hole pressure and fracture properties. This quantity may be related to the size of the fracture, which may further be inferred from changes in down-hole pressure. FIG. 5 illustrates a graph of an exemplary learning model using down-hole pressure changes to determine fracture diameter and determine a quantity of diverters needed to sufficiently redistribute the fracturing fluid between fractures. In FIG. 5, down-hole pressure sensor readings suggest a fracture diameter at point A while a desired fracture diameter exists at point B; therefore, the desired quantity of diverters is determined based on the curve from point A to point B. The optimal controller may determine the desired fracture diameter based on the desired bottom-hole pressure by combining historical data, including diverter quantities used in similar formations and down-hole conditions, and model output, which accounts for diverter properties such as quantity, size, and material; type of subterranean formation; stress load on the subterranean formation; well properties such as type and depth; number of fractures; fracturing fluid properties; and proppant characteristics such as quantity, size, and material. After determining the desired fracture diameter, the optimal controller may interpolate between historical data points, use regression analysis, or employ other analytic methods to determine the curve describing the change in fracture diameter based on down-hole pressure and to determine the desired quantity of diverters to achieve the desired fracture diameter.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces. While compositions and methods are described in terms of "comprising," "containing," or "including" various components or steps, the compositions and methods can also "consist essentially of" or "consist of" the various components and steps. If there is any conflict in the usages of a word or term in this specification and one or more patent or other documents that may be incorporated herein by reference, the definitions that are consistent with this specification should be adopted.

A number of examples have been described. Nevertheless, it will be understood that various modifications can be made. Accordingly, other implementations are within the scope of the following claims.

What is claimed is:

1. A method for fracturing a stage of a subterranean formation, comprising:
    (a) creating or extending a plurality of fractures in the subterranean formation;
    (b) pumping fracturing fluid into the plurality of fractures;
    (c) identifying dominant fractures among the plurality of fractures by measuring the flow rate of the fracturing fluid using fiber optics, measuring fracture growth of the plurality of fractures, or any combination thereof;
    (d) determining a desired amount of diverters to deliver to the dominant fractures based, at least in part, on a model, historical data, real-time data, or any combination thereof; and
    (e) delivering the determined amount of diverters to the dominant fractures so as to redistribute the flow of fracturing fluid between the plurality of fractures.

2. The method claimed in claim 1 wherein the model utilizes one or more of the following parameters: type of subterranean formation, stress load on the subterranean formation, well type, well depth, number of fractures, fluid properties and proppant characteristics.

3. The method claimed in claim 2 wherein determining is based, at least in part, on the model and on historical data from previous fracturing steps performed in or around the subterranean formation or like formations.

4. The method claimed in claim 2 wherein the model comprises minimizing a sum of a first term and a second term, wherein the first term is a product of some constant and a sum of the squares of the difference between each fracture's current and baseline pressures; and the second term is the product of some constant and a sum of the squares of the difference between each fracture's pressure and the average of all fractures' pressure, whereby the minimum is determined from the equation:

$$\min \sum_{j=k}^{k+N} \left[ W_1 \sum_{i=1}^{m} (y_i(j) - p_0)^2 + W_2 \sum_{i=m+1}^{2m} (y_i(j) - \bar{y}_i(j))^2 \right].$$

5. The method claimed in claim 1 wherein the historical data is from prior fracturing performed in or around the subterranean formation or like formations.

6. The method claimed in claim 1 wherein (c), (d) and (e) are repeated for the stage in the subterranean formation.

7. The method claimed in claim 1 wherein (a), (b), (c), (d) and (e) are repeated in a different stage of the subterranean formation.

8. A system for creating or extending a plurality of fractures in a stage of a subterranean formation, comprising:
    (a) a pump operable:
        (i) to deliver fracturing fluid into the subterranean formation to create or extend the plurality of fractures, and
        (ii) to deliver a plurality of diverters into one or more of the plurality of fractures;
    (b) at least one processor; and
    (c) a memory including non-transitory executable instructions that, when executed, cause the at least one processor to:
        (i) identify dominant fractures among the plurality of fractures by measuring the flow rate of the fracturing fluid, measuring fracture growth of the plurality of fractures, or any combination thereof, and
        (ii) determine a desired amount of diverters to deliver to the dominant fractures that will redistribute the flow of fracturing fluid into the plurality of fractures based, at least in part, on a model, historical data, real-time data, or any combination thereof.

9. The system of claim 8, wherein the model utilizes one or more of the following parameters: type of subterranean formation, stress load on the subterranean formation, well type, well depth, number of fractures, fluid properties, and proppant characteristics, and wherein the executable instructions cause the at least one processor to determine the desired amount of diverters to deliver to the dominant fractures based on the model.

10. The system of claim 9, wherein the processor determines the desired amount of diverters to deliver to the dominant fractures based, at least in part, on the model and on historical data from previous fracturing steps performed in or around the subterranean formation or like formations, and wherein the executable instructions cause the at least one processor to determine the desired amount of diverters to deliver to the dominant fractures based on the model and on the historical data.

11. The system claimed in claim 9, wherein the model comprises minimizing a sum of a first term and a second term, wherein the first term is a product of some constant and a sum of the squares of the difference between each fracture's current and baseline pressures; and the second term is a product of some constant and a sum of the squares of the difference between each fracture's pressure and the average of all fractures' pressure, whereby the minimum is determined from the equation:

$$\min \sum_{j=k}^{k+N} \left[ W_1 \sum_{i=1}^{m} (y_i(j) - p_0)^2 + W_2 \sum_{i=m+1}^{2m} (y_i(j) - \bar{y}_l(j))^2 \right].$$

12. The system of claim 8, wherein the historical data is from previous fracturing steps performed in or around the subterranean formation or like formations, and wherein the executable instructions cause the at least one processor to determine the desired amount of diverters to deliver to the dominant fractures based on the historical data.

13. The system of claim 8, wherein the processor repeats identifying dominant fractures among the plurality of fractures following the delivery of diverters into the one or more plurality of fractures; and determines a new desired amount of diverters to deliver to the newly identified dominant fractures that will redistribute the flow of fracturing fluid into the plurality of fractures.

14. The system of claim 8, wherein the pump delivers fracturing fluid into subterranean formations to create or extend the plurality of fractures; delivers a plurality of diverters into one or more of the plurality of fractures; and wherein the processor repeats identifying dominant fractures among the plurality of fractures following the delivery of diverters into the one or more plurality of fractures; and determines a new desired amount of diverters to deliver to the newly identified dominant fractures that will redistribute the flow of fracturing fluid into the plurality of fractures.

15. The system of claim 8, further comprising fiber optics connected to the processor, which measure a flow rate of the fracturing fluid being delivered into the plurality of fractures, and wherein the processor utilizes the flow rate of the fluid into the plurality of fractures in identifying the dominant fractures.

16. The system of claim 8, further comprising a microseismic sensor connected to the processor, which measures fracture growth rate of the plurality of fractures, and wherein the processor utilizes the fracture growth rate of the plurality of fractures in identifying the dominant fractures.

17. A non-transitory computer-readable medium storing instructions that, when executed by at least one processor, performs operations comprising:
    (a) identifying dominant fractures among a plurality of fractures in a stage of a subterranean formation by measuring the flow rate of the fracturing fluid using fiber optics, measuring fracture growth of the plurality of fractures, or any combination thereof; and
    (b) determining a desired amount of diverters to deliver to the dominant fractures that will redistribute the flow of fracturing fluid into the plurality of fractures based, at least in part, on a model, historical data, real-time data, or any combination thereof.

18. The computer-readable medium of claim 17, wherein the at least one processor identifies dominant fractures among a plurality of fractures in a stage of a subterranean formation using fiber optics.

* * * * *